United States Patent

[11] 3,626,205

[72] Inventor Heinrich Rudolf Sturm
Stockholm, Sweden
[21] Appl. No. 855,333
[22] Filed Sept. 4, 1969
[45] Patented Dec. 7, 1971
[73] Assignee Telefonaktiebolaget LM Ericsson
Stockholm, Sweden
[32] Priority Sept. 26, 1968
[33] Sweden
[31] 12974/68

[54] ARRANGEMENT FOR INDICATING THE EXCEEDING OF A CERTAIN FREQUENCY OF A PERIODICAL SIGNAL
4 Claims, 1 Drawing Fig.

[52] U.S. Cl. .......... 307/233, 307/252 J, 328/138
[51] Int. Cl. .......... H03k 5/20
[50] Field of Search .......... 307/233, 252.51, 291; 328/138, 140

[56] References Cited
UNITED STATES PATENTS

| | | | |
|---|---|---|---|
| 3,075,127 | 1/1963 | Secunde .......... | 307/233 |
| 3,129,390 | 4/1964 | March .......... | 307/233 |
| 3,214,698 | 10/1965 | Chesnut .......... | 307/233 |
| 3,462,614 | 8/1969 | Barlow .......... | 307/233 |

*Primary Examiner*—Donald D. Forrer
*Assistant Examiner*—David M. Carter
*Attorney*—Hane & Baxley ABSTRACT: An arrangement for indicating when a periodic signal exceeds a certain frequency. The periodic signal is supplied to the gate of a thyristor, the anode and cathode of which are connected between the poles of a direct voltage source in series with a time delayed indication relay. An integration circuit comprising a capacitor is connected in parallel with the relay. At a certain phase angle, the periodic signal makes the thyristor conductive and, if the capacitor is mainly uncharged, starts the charging of the capacitor. The termination of the charging causes a pulse to be fed to the base of a transistor that short circuits the thyristor before the relay is activated and the short-circuiting of the thyristor initiates a discharging of the capacitor. The time constant of the discharging process is chosen in such a way that if the frequency of the periodic signal is higher than a certain predetermined value, the capacitor is still charged when the thyristor is made conductive so that no charging process is started and consequently no pulse is supplied to the transistor and the indication relay is activated.

PATENTED DEC 7 1971
3,626,205
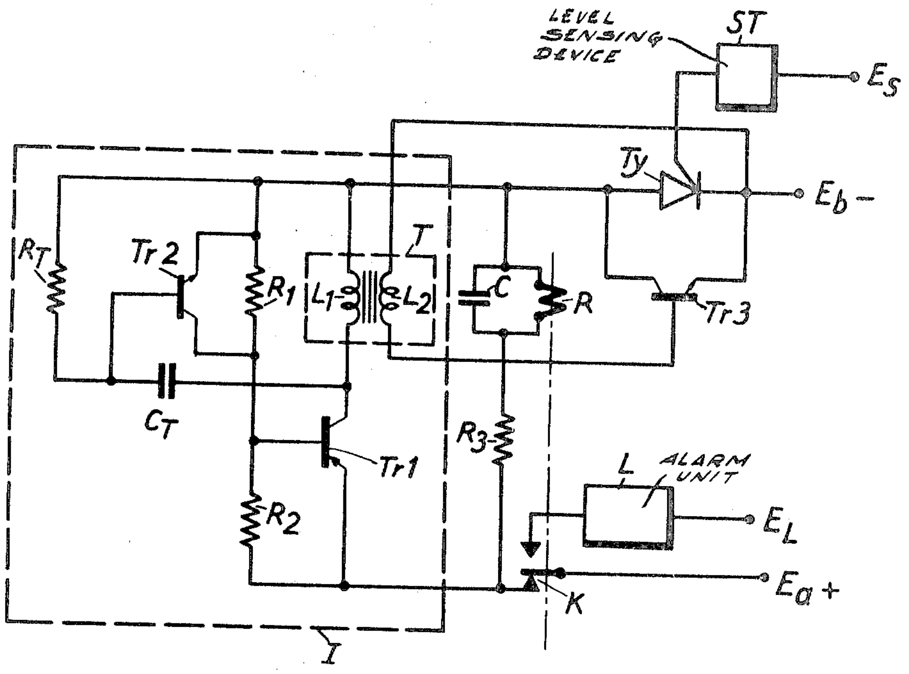
INVENTOR
HEINRICH RUDOLF STURM
BY Hane and Baxley
ATTORNEYS

ARRANGEMENT FOR INDICATING THE EXCEEDING OF A CERTAIN FREQUENCY OF A PERIODICAL SIGNAL

The present invention relates to an arrangement for frequency supervision, and more particularly for indicating the exceeding of a certain frequency of a periodic signal.

In a large number of applications it is necessary to decide whether the frequency of a periodic signal exceeds a certain critical value. This is, for example, the case when the frequency precision of an oscillator is being checked by comparing its frequency with the frequency of a precision oscillator and measuring the frequency difference of the oscillators, in order to decide if the frequency precision of the oscillator is within predetermined limits. Up to now this procedure has usually been carried out by recording the difference frequency on a tape of paper which is examined at certain intervals. Such a method is of course circumstantial and often unreliable because the recorder is mechanically imperfect. It has therefore been suggested that the recorder should be replaced by an electronic arrangement of a digital type, i.e. some kind of a counter. If, however, it is only required that the arrangement should indicate whether a certain frequency is exceeded, an arrangement of the mentioned kind is unnecessarily expensive. An object of the present invention is thus to provide an arrangement of a simple construction, in which an indication is obtained when a periodic signal supplied to the arrangement exceeds a certain frequency. The characteristics of the invention appear in the following claims.

The invention will be more fully described with reference to the accompanying drawing, showing a circuit diagram of an arrangement according to the invention.

In the drawing references E*a*, E*b* denote the positive and negative pole respectively of a direct voltage source. The terminal E*b* of the direct voltage source is connected to the cathode of a thyristor T*y*. The input E*s* of the arrangement which receives the periodic signal whose frequency is to be detected is connected via a level sensing device ST, such as a Schmitt-trigger, to the gate electrode of thyristor T*y*. It is presumed that the periodic signal actuates the level sensing device so that the thyristor is made conductive at a certain phase angle of the periodic signal. Between the anode of the thyristor T*y* and the terminal E*a* a relay R is connected in series with a resistance R3. The make-time, i.e., the time elapsing between the flow of current through the relay coil and the operation of the relay contacts, of the relay is prolonged by means of a capacitor C connected in parallel with the relay coil. A make-and-break contact K on the relay breaks the direct current circuit between the terminals E*a* and E*b* when the relay is activated. An integrating circuit I is furthermore connected in parallel with the relay coil. To the input terminals of the circuit are connected firstly via a series connection consisting of a coil L1, constituting the primary winding of a transformer T, and a transistor T*r*1, and secondly via a voltage divider comprising resistors R1, R2. The tap of the voltage divider is then connected to the base of the transistor T*r*1 and the collector of the transistor is connected to the anode of the thyristor via a capacitor $C_T$ and a resistor $R_T$. The junction of the capacitor $C_T$ and the resistance is connected to the base of a transistor T*r*2, the emitter and collector of which are connected to the terminals of the resistance R1. The secondary winding L2 of the transformer T is connected between the cathode of the thyristor T*y* and the base of a third transistor T*r*3, the collector and emitter of which are connected to the anode and cathode respectively of the thyristor T*y*.

The arrangement works in the following way: The periodic signal supplied to the gate electrode of the thyristor T*y* makes the thyristor conductive at a certain phase angle. The integrating circuit I is so dimensioned that its two transistors will be conducting, the condition for the transistor T*r*1 to be conducting being that the resistor R1 is short circuited by the transistor T*r*2. When the thyristor T*y* becomes conducting a charging of the capacitor $C_T$ via the transistors T*r*1 and T*r*2 is initiated, so that the conductivity of the transistor T*r*2 is quickly reduced, whereby the potential on the base of the transistor T*r*1 increases, the collector potential of the transistor T*r*1 decreases and the positive feedback to the base of the transistor T*r*2 across the capacitor $C_T$ and the regenerative effect causes the current through the transistor T*r*1 to abruptly terminate. This results in a pulse being generated in the secondary winding L2 of the transformer T, whereby the transistor T*r*3 is saturated and the thyristor T*y* is short-circuited and starved of current. The integration circuit is also dimensioned in such a way that the short-circuiting pulse occurs before the relay R is activated. When the thyristor has been blocked or cut off a discharge of the capacitor $C_T$ through the resistance $R_T$ and the coil L1 is initiated. The discharge circuit is so dimensioned i.e., has such a time constant that when the frequency of the periodic signal does not exceed the highest permitted value the capacitor $C_T$ has the time to be discharged almost completely before the thyristor is again made conducting and the above-described process is repeated. If, however, the frequency of the periodical signal exceeds this value a certain charge still remains across the capacitor when the thyristor is again made conducting. If then the sum of the capacitor voltage and the base-emitter voltage of the transistor T*r*2 exceeds the voltage occurring across the coil L1 when the thyristor becomes conducting no current will pass through the capacitor, and, so, the transistors T*r*1 and T*r*2 are blocked as the transistor T*r*1 does not obtain any base current, and no pulse will appear at the base of the transistor T*r*3. Therefore, the relay R is activated and the potential of the pole E*a* is supplied to an alarm unit L. Hereby the current to the relay and the thyristor, which is being blocked, is broken and the process described above is repeated. The alarm unit may of course be constructed in different ways, for example so that it generates an alarm signal at its output $E_L$ only if the number of supplied pulses within a certain time exceeds a certain value.

Furthermore the thyristor T*y* may of course be replaced by other devices having the same function, for example a bistable flip-flop circuit.

We claim:

1. An apparatus for indicating the exceeding of a predetermined frequency by a periodic signal comprising: a switching means having a first control input means for triggering said switching means to a conductive state and second control input means for triggering said switching means to a nonconductive state, said first control input means being adapted to receive the periodic signal; a direct voltage source; a time-delayed indicator means; means for serially connecting said switching means, said direct voltage source and said time-delay indicator means; an integrating means having two terminals and connected in parallel with said time-delayed indicator means and comprising a first transistor having base, collector and emitter electrodes; a timing circuit comprising a resistor and a capacitor; means for serially connecting said timing circuit and said collector and emitter electrodes between said two terminals whereby when said switching means are in a conductor state and said first transistor conducts said capacitor is charged from a substantially uncharged state; further switching means connected to said capacitor base electrode for blocking current flow between said terminals via said first transistor when said capacitor is charged to a predetermined value, and for initiating the discharge of said capacitor; a pulse generating means comprising a transformer having a primary and secondary winding; means for serially connecting said primary winding and said collector and emitter electrodes between said two terminals; means for connecting said secondary winding to said second control input means whereby when current flow is blocked between said terminals via said first transistor said transformer transmits a control pulse to said second control input means for triggering said switching means to a nonconductive state, the charging time for said capacitor to accumulate charge from said substantially uncharged state to said predetermined value being less than the time required for said time-delayed indicator means to operate, and the time constant of said resistor and capacitor being so chosen that when the frequency of the periodic signal exceeds the predetermined frequency said capacitor does not discharge to said substantially uncharged state and insufficient current flows through said primary winding whereby said pulse generating means cannot transmit a control pulse to said second control input so that said switching means remains in said conductive state and said time-delayed indicator means operates.

2. The apparatus according to claim 1 wherein said integration circuit further comprises a voltage divider connected across said two terminals, a tap of said voltage divider being connected to said base of said first transistor, a second transistor having base, emitter and collector electrodes, the collector-emitter path of said second transistor being connected between said tap and one end of said voltage divider, and said base electrode of said second transistor being connected to one of said two terminals of said integration circuit via said resistor and said capacitor.

3. The apparatus according to claim 1 and further comprising a level sensing device connected to said first control signal input of said switching means and having an input adapted to receive the periodic signal so that pulse shaped signals are received by said first control signal input.

4. The apparatus according to claim 1 wherein said switching means comprises a thyristor.

* * * * *